(12) United States Patent
Artley et al.

(10) Patent No.: US 7,585,330 B2
(45) Date of Patent: *Sep. 8, 2009

(54) METHOD OF MAKING POLYETHYLENE GLYCOL TREATED FABRICS

(76) Inventors: John W Artley, 4 Park Ave., Apt. 10-R, New York, NY (US) 10016; Thomas E Lister, N. 6570 Riverview Rd., Black River Falls, WI (US) 54615

( * ) Notice: Subject to any disclaimer, the term of this patent is extended or adjusted under 35 U.S.C. 154(b) by 166 days.

This patent is subject to a terminal disclaimer.

(21) Appl. No.: 11/005,083

(22) Filed: Dec. 6, 2004

(65) Prior Publication Data

US 2005/0144733 A1 Jul. 7, 2005

Related U.S. Application Data

(63) Continuation-in-part of application No. 10/022,959, filed on Dec. 18, 2001, now Pat. No. 7,264,638.

(51) Int. Cl.
*D06M 13/148* (2006.01)

(52) U.S. Cl. .................................. 8/115.56; 427/372.2

(58) Field of Classification Search .................. 8/115.6, 8/115.56; 427/372.2

See application file for complete search history.

(56) References Cited

U.S. PATENT DOCUMENTS

| | | | | |
|---|---|---|---|---|
| 3,449,061 | A | * | 6/1969 | Palmer et al. ................. 8/127.6 |
| 3,795,481 | A | * | 3/1974 | von der Eltz ................... 8/531 |
| 3,981,807 | A | | 9/1976 | Raynolds |
| 4,099,913 | A | * | 7/1978 | Walter et al. ................... 8/477 |
| 4,780,102 | A | | 10/1988 | Harper, Jr. |
| 4,851,291 | A | | 7/1989 | Vigo et al. |
| 4,871,615 | A | | 10/1989 | Vigo et al. |
| 4,908,238 | A | * | 3/1990 | Vigo et al. ................... 427/389 |
| 5,562,739 | A | * | 10/1996 | Urben ......................... 8/116.4 |
| 6,617,268 | B1 | | 9/2003 | Offord et al. |
| 7,264,638 | B2 | * | 9/2007 | Artley et al. ................. 8/115.56 |

* cited by examiner

*Primary Examiner*—Lorna M Douyon
*Assistant Examiner*—Amina Khan
(74) *Attorney, Agent, or Firm*—Schmid PA

(57) ABSTRACT

Disclosed is a method of preparing a temperature adjustable textile. The textile includes most any substrate including knits, wovens, nonwoven and foams. The treated substrate can absorb and release heat at various critical temperatures depending upon the molecular weight used of a polyethylene glycol formation added to the textile.

17 Claims, 5 Drawing Sheets

The PEG System

Module A – Formula Application

Module B – Curing Oven

Module C - Wash Box

Module D – Dryer

Bulk Treatment

Thermal Cascading

PEG Formula Used as a Binder for Nonwoven Susbstrates

METHOD OF MAKING POLYETHYLENE GLYCOL TREATED FABRICS

RELATED APPLICATION

This application is a continuation-in-part of U.S. patent application Ser. No. 10/022,959, filed Dec. 18, 2001, now U.S. Pat. No. 7,264,638, the contents of which is hereby incorporated in its entirety.

FIELD OF THE INVENTION

The present invention generally relates to treated fabrics or substrates in particular it relates to fabrics that are treated with a polyethylene glycol and a method for treating fabrics with polyethylene glycol.

BACKGROUND

Temperature adaptable textile substrates have been previously demonstrated and described by Vigo, et al in U.S. Pat. No. 4,851,291 (issued Jul. 25, 1989), U.S. Pat. No. 4,871,615 (issued Oct. 3, 1989) and U.S. Pat. No. 4,908,238 (issued Mar. 13, 1990). However the textiles listed above exhibit certain limitations when the technology is applied in commercial production.

The known formulations included chemicals that were not suitable for broad commercial use and resulted in occasional "reaction reversal" causing the bound polymers and resins to return to a liquid form and drain from the fabrics. Furthermore, the known formulations include polyethylene glycol formulations containing inappropriate molecular weights resulted in inconsistent and irrelevant thermal performance incompatible with desired human comfort levels. Additionally, the resulting fabrics often have a hand feel that is stiff and unacceptable for use.

Additionally, polymer add-on levels were often inconsistent resulting in unacceptable commercial performance and unnecessarily high chemical costs. Drying and curing times and curing temperatures were not compatible with available textile plant processing equipment and hardware. Furthermore, inconsistent "cross-linking" of the formula on certain substrates results in unacceptably high scrap rates and under certain conditions, treated materials are often slippery, heavy and curled when wet and unable to be processed on standard textile finishing plant equipment. Often, formulation residue is found on the treated fabrics giving the substrate an unacceptable wax-like or "greasy" feel.

SUMMARY

The present invention provides a method of preparing a temperature adjustable textile. The textile includes most any substrate including knits, wovens and nonwovens. The treated textile can absorb and release heat at various comfort relevant temperatures depending upon the molecular weight of the PEG used in the formulation added to the textile substrate.

In greater detail, the method of preparing a temperature adjustable textile includes treating a textile with a polyethylene glycol formulation to form a treated textile. The treated textile is then cured wherein the surface temperature of the textile is raised between about 200° F. to about 240° F. to form a cured textile. The cured textile is then neutralized to a pH between about 6.5 to 7.5. Furthermore, the polyethylene glycol formulation may be preheated before being applied to the textile to a temperature of between about 90° F. to about 110° F. to speed application, drying and curing times. Additionally, the treated textile may also be preheated before curing for the same reason.

An excess of polyethylene glycol formulation may be removed from the wet fabric using such methods as vacuum extraction. The cured textile may be neutralized by washing the cured textile in an alkaline solution. Additionally, the polyethylene glycol formulation may be sprayed on or foamed onto the textile.

The polyethylene glycol formulation may include a polyethylene glycol comprised of a singular molecular weight. Additionally, the polyethylene glycol comprises a molecular weight between about 1400 and 1500. In the composition of the polyethylene glycol formulation, the formulation includes a crosslinking agent, an organic acid, a metal salt and polyethylene glycol.

In a further embodiment, the method of preparing a temperature adjustable textile includes treating a plurality of textile substrates with a polyethylene glycol formulation wherein each substrate is treated with polyethylene glycol formulation having different molecular weight such that each substrate has a different thermal profile. The method then includes curing the treated textile substrates at a surface temperature of the textile between about 200° F. to about 240° F. to form a cured textile and neutralizing the cured textile substrates. The textile substrates are then combined to form a "cascading" textile that has serial thermal gradients that absorb and release heat over a broad range of temperatures.

In further detail, the method includes treating a first textile substrate with a polyethylene glycol formulation comprised of essentially a molecular weight of about 1450 and a second textile substrate treated with a polyethylene glycol formulation comprised of essentially a molecular weight of about 1200 and a third textile substrate treated with a polyethylene glycol formulation comprised of essentially a molecular weight of about 1000. The differing layers are then combined to provide a "cascading" textile.

A further embodiment includes a method of preparing a temperature adjustable textile including treating a textile with a polyethylene glycol formulation wherein the polyethylene glycol comprised of essentially a singular molecular weight to form a treated textile. After applying the formulation to the textile, the textile is then cured to a final surface temperature of about 200° F. to about 240° F. to form a cured textile and the neutralizing the cured textile to a pH between about 6.5 to about 7.5.

DRAWINGS

DETAILED DESCRIPTION

Figure 1:
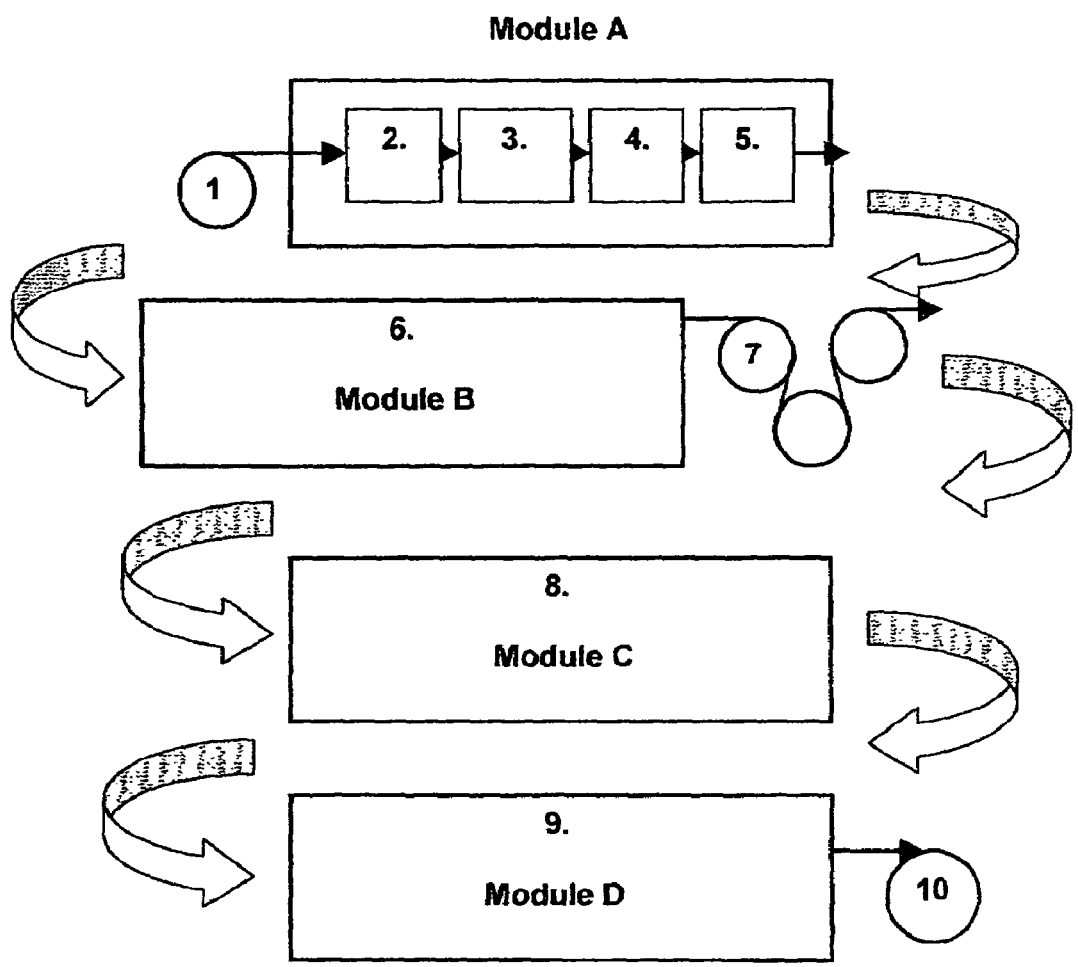
FIG. 1 depicts the preferred embodiment of the process flow diagram for Modules A-D.

Disclosed is a method of preparing a temperature adjustable textile including wetting a textile with a polyethylene glycol formulation to form a treated textile. The treated textile is then cured wherein the surface temperature of the textile is raised between about 200° F. to about 240° F. to form a cured textile. The cured textile is then neutralized to a pH between about 6.5 to about 7.5. Furthermore, the polyethylene glycol formulation may be preheated before being applied to the textile to a temperature of between about 90° F. to about 110° F. Additionally, the treated textile may also be preheated before curing.

The terms "PEG," "PEG Technology," "PEG-treated," "PEG-saturated," PEG formulation," or "PEG formula," are used individually, interchangeably or collectively to mean the chemical formulas and the methods and technique(s) used for the permanent application and bonding of the polyethylene glycol polymer to a substrate. The term "substrate" is interchangeable with the term textile and includes any fiber, fiber blend, fabric or material whether nonwoven, knit or woven, or any structure such as reticulated polyurethane foam, for example, or a film, to which the PEG Technology is, may be, or has been, applied in a commercial production environment. The term "polyethylene glycol" is the name of a long chain water-soluble polymer produced in varying molecular weights and which is the primary chemical component of the PEG Technology along with various binders, catalysts and acids.

The Textile

The term "textile" may be interchanged with the term "substrate. The term "textile" is defined to include any woven, nonwoven or knit construction, of any fiber type or fiber blend; or, any foam structure, or any other material or film which lends itself to application of the PEG formula.

The PEG Formula

Various molecular weights of the polyethylene glycol polymer have been employed in the PEG formula. Different molecular weights have different melting and crystallization points, both of which have an impact on the performance of substrates treated with PEG. For example, polyethylene glycol with a molecular weight of 1450 has been demonstrated to provide good thermal performance over the relevant range of human comfort.

Dilution techniques are disclosed which permit the PEG formula to be "cut," or diluted, with water without having a negative impact on the performance of the PEG-treated substrate. By increasing the ratio of water to the PEG polymer, and other solids contained within the formula, better control of the wet formula pickup is realized. Additionally, the reduced solids content of the PEG formula results in an improved "hand" by lowering the additive chemical content of the finished goods.

Resins and catalysts with ultra low levels of formaldehyde or emissions thereof have been incorporated into the PEG formula with no degradation of performance. Where formaldehyde is present, levels have been reduced to approximately 53 parts per million (based upon the AATCC Method 112 Sealed Jar Test after three replications). Additionally, formaldehyde emissions may be reduced further depending upon the levels added and the performance of the scavenger. The amount of resin employed in the PEG formula has been varied and reduced by utilizing more efficient and highly reactive resins. Environmentally friendly acid catalysts, such as citric acid and magnesium chloride, have been substituted for earlier types of acids such as p-toluene-sulfonic acid. An example of an improved PEG formula would include: 10-20% DMDHEU Resin, 5% MgCl, 5% Citric Acid and 50% PEG.

With all of the components of the formula thoroughly blended using paddle blades in a holding tank mounted close to the point of its application. Depending upon the use and application of the substrate treated with PEG, there are numerous variations to the formula. The PEG Technology may be used as a "carrier" of other beneficial performance enhancing chemistries such as insect repellants or color dyes. Furthermore, foaming agents maybe incorporated into the PEG formula with no adverse effect to the catalytic reaction. This permits the foaming of the PEG formula on to a substrate resulting in better control of the PEG formula wet add-on for single-sided treatment emphasis and a corresponding reduction in chemical costs.

PEG formulae incorporating higher molecular weight polyethylene glycol, when applied to a variety of substrates, significantly increases the snag performance and abrasion resistance of the treated material at dry add-on levels which are below add-on levels previously claimed in prior issued patents.

Method of Applying and Curing the PEG Formula

The following sections, Modules A-D (FIG. 1), describe the individual components of a fully integrated, continuous process system designed for the commercial application of the PEG Technology to virtually any substrate including knit, woven and nonwoven materials. The PEG formula may be applied to any substrate, then dried, cured and neutralized in a continuous, totally integrated multiple step system. For maximum flexibility, the individual modules described below cover a specific function. Each A, B, C or D Module also incorporates several alternative solutions (FIGS. 1, 2-9) for a specific application function, thereby providing an optimum system configuration for any specific substrate, or substrate type, to be treated with the PEG Technology.

EXAMPLE 1

In the first instance, an open-width, shirt weight fabric is to be treated with a particular PEG formula, then cured and neutralized. In this case, the PEG formula is maintained at a temperature of about 114° F. (45° C.) in an on-line formulation-holding tank (2) (employing a PEG molecular weight of 1450). The PEG formula is applied using a PAD (3) and the fabric is then fed into the oven (6), and/or passed over drying cans (7) for drying and curing. Because the shirt weight fabric weighs only about 4 ounces per square yard, the target weight for dry (weight after curing) PEG formula add-on is approximately up to 30 or in other applications up to 60%.

The combined weight of the substrate and PEG after application and curing is about 5.2 ounces per square yard. Also, because the fabric is lightweight, the pin tenter frame option is selected to hold the fabric in position as it passes through the oven. Additionally, because of the lightweight of the fabric, oven dwell times are reduced thereby increasing the throughput speed of the substrate through The PEG System. The shirt weight fabric is next neutralized (8) as discussed in the Module "C" Section, and then dried (9) as described in the Module "D" Section, and rolled (10) for shipment.

EXAMPLE 2

In another instance, a high loft open width nonwoven substrate comprising a blend of 50% wood pulp fibers and 50% polyester is being treated with the PEG formula. The target dry PEG formula add-on, after curing, is about 60%; the weight of the nonwovens substrate before the application of PEG is 6 ounces per square yard. The combined weight of the substrate and PEG after application and curing is about 9.5 ounces. The application for this treated structure is an absorbent incontinent underpad. For maximum liquid absorption, the loft, or height of the nonwoven substrate must be maintained. Therefore, for this nonwoven substrate, the PEG formula is applied by spray assembly and vacuum extraction (4). The spray/vacuum module is positioned in front of the curing oven. As the substrate is unwound, roller units are used to route the substrate over and/or around the PAD (3) and through the spray/vacuum unit (5). Because it is desirable to process the nonwovens substrate at the highest throughput rate feasible without effecting the bond of the PEG formula to the fibers, infrared heaters may be utilized to pre-heat the PEG saturated substrate just before it enters the drying/curing oven (6).

A chain driven belt assembly is utilized to carry the PEG saturated nonwoven structure through the drying/curing oven (6) in a relaxed state. Because of the loft of the nonwoven structure, the throughput rates, and zone-by-zone oven temperature may be readily adjusted to correspond to the curing times required for this type of structure, but generally the curing temperatures would be in the range of between 212° F. and 220° F.

Once the high loft nonwoven structure has been dried and cured, drive roller assemblies are used to pull the treated and cured nonwoven substrate from the curing oven and to pass it through the Module "C" neutralization tank (8). The nonwoven substrate passes from the neutralization tank, is rinsed and then reintroduced to a dryer unit (9) which removes the water from the nonwoven. The treated and processed substrate is wound into a roll (10) and the process has been completed.

Module "A" Section

Figure 2:
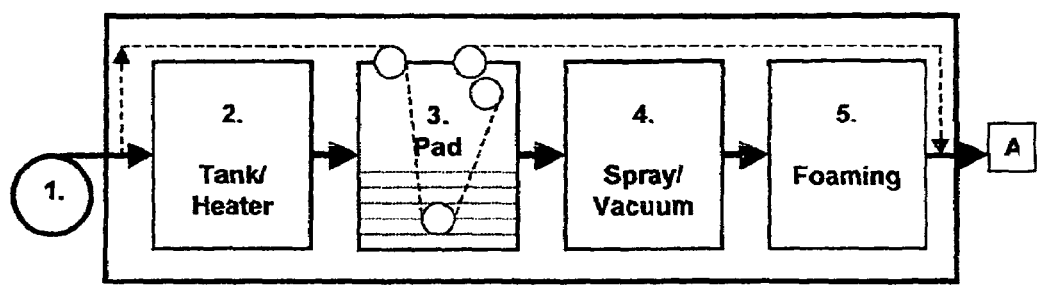
FIG. 2 depicts the Module A embodiment.
Figure 3:
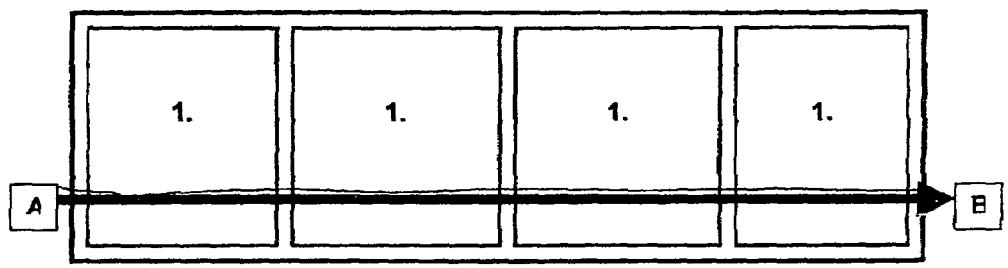
FIG. 3 depicts the Module B embodiment.
Figure 4:
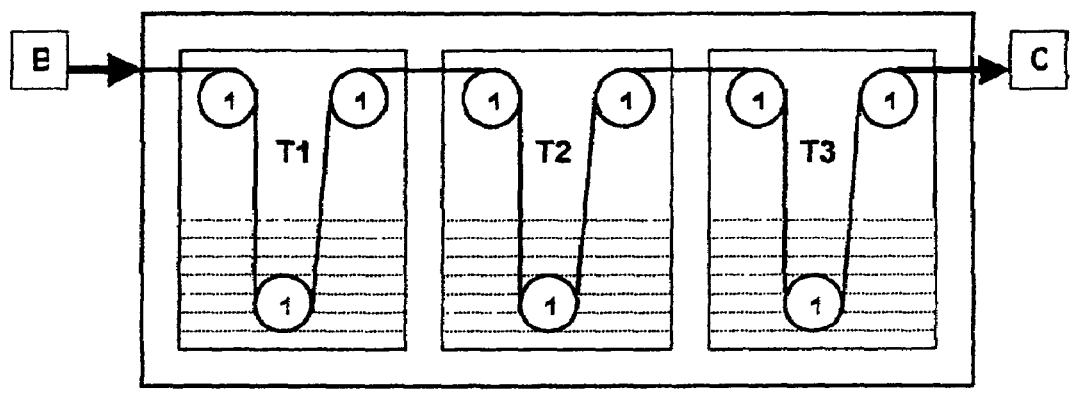
FIG. 4 depicts the Module C embodiment.
Figure 5:
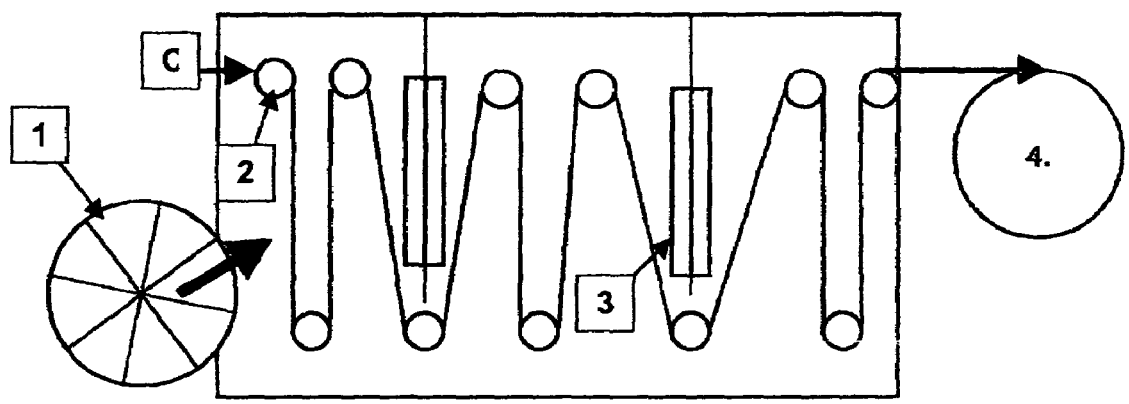
FIG. 5 depicts the Module D embodiment.

Preparation of a Substrate Prior to Drying, Curing and Neutralization Scouring and Burning to Remove Surface Finishes Before the Application of the PEG Formula The following embodiments are depicted in FIG. 2. A more efficient bond of the PEG formula to a substrate can be effected if the material or substrate is first thoroughly scoured, washed or surface burned to remove any residual surface finishes from the textile prior to the PEG application. Surface finishes that should be removed include, for example, lubricants, waxes and oils. These finishes are typically applied to fibers, or yard goods, as part of the substrate manufacturing process.

If residual surface finishes are not completely removed from a fabric or material prior to applying the PEG formula, optimal complete catalytic reaction and bonding of the resins and polyethylene glycol to the substrate fibers will not occur.

Reduction of oven dwell times and/or the acceleration of the drying/curing and bonding process is accomplished by pre-heating the PEG-saturated substrate prior to its passing into the curing oven. After saturation with the already pre-heated PEG formula using one, or a combination of the two techniques described below, the PEG-treated substrate is further heated to approximately 212° F. (100° C.) prior to entering the oven. This results in a faster more complete reaction of the cross-linking process.

No. 1—Maintaining the PEG Formulation in a Viscous State by Pre-Heating Prior to its Application to a Substrate The ease, speed and accuracy of the actual application of the PEG formula to a substrate may be improved if the formula is maintained at an elevated temperature and remains in a less viscous state. This may take place in a drum or holding tank (2), or other suitable container which contains, or is surrounded by, a suitable heating element.

No. 2—Pre-Heating of a PEG-Saturated Structure Before it Enters the Curing Oven

Preheating a PEG-treated substrate before it enters the curing oven helps to reduce thermal droop in the curing oven interior and assists in the maintenance of a more uniform temperature within the individual zones of the curing oven resulting in an improved quality product.

By pre-heating of the PEG-treated substrate prior to entering the curing oven, the thermal phase change "defense" mechanism of the PEG Technology is overwhelmed to the point where the crystalline structure of the polyethylene glycol can no longer substantially absorb additional thermal energy, and the actual temperature of the structure will now rise to the temperature point needed to effect the catalytic reaction in the PEG formula which is 220° F. for 1½ minutes, which temperature initiates the bonding process Pre-heating the substrate results in (a) a more efficient and uniform cure of the PEG-treated substrate, (b) an acceleration of the speed of the curing process, (c) less reduction in the interior temperature of the oven, (d) the utilization of smaller curing ovens.

Pre-heating of the substrate is particularly applicable to thicker and/or denser substrates. Other types of lightweight substrates, often do not require pre-heating because the thermal properties of these types of fabrics are relatively insignificant compared with a more dense, higher loft substrates.

Additionally, two types of readily available heat sources are effective for preheating a PEG-treated structure before it enters the drying/curing oven. The first heat sources is high pressure steam passed through a perforated hollow tube, or tubes, mounted across the web, or width, of the substrate, just in front of the entrance to the curing oven. The second technique is to install controlable infrared heaters in approximately the same location as the steam heaters.

The advantage of infrared heaters is that they may be quickly and more accurately controlled and adjusted as compared to a steam heat source. A broader range of PEG-treated substrates may be processed with the PEG System using infrared heating devices. Additionally, with the use of infrared-type heaters, no additional water is added to the substrate as is the case with the use of steam.

Using a PAD to Apply the PEG Formula to a Substrate

In many instances, a traditional PAD and nip roller assembly (3) of the type found throughout the textile industry, may be utilized to apply the PEG Formula to a substrate before entering the drying/curing oven. Typically, PADs are used to apply a range of standardized finishes to textiles such as anti-wrinkling finishes for example. The pre-heated PEG formula is first poured into the heated PAD holding tank and maintained thereafter at a constant level within the tank. One, or more, rubber coated nip, or "pinch" drive roller assemblies, pull the substrate to be saturated with the PEG Technology from the roll of substrate material previously positioned in front of the PAD. The substrate material passes into the PAD formula holding tank where it is passed over and under a series of rollers positioned in the tank. This provides the material with adequate dwell time within the tank to be thoroughly saturated with the PEG formula. The PEG-saturated substrate emerges from the tank where it next passes through a second set of rubber coated nip drive roller assemblies. The pressure applied to this set of drive rollers may be controlled to a pre-determined pressure level. As the PEG saturated substrate passes through the second set of nip drive roller assemblies, the excess PEG formula is squeezed from the substrate and drains back into the holding tank for reuse. The PEG-treated substrate next passes into the drying/curing oven. The pressure applied to the nip rollers determines the desired amount of wet pickup needed to arrive at the preferred dry add-on after curing of the substrate.

Depending upon the type of material being treated with the PEG formula, as well as other variables such as the loft of the substrate and/or its basis weight, modified PAD drive rollers may be required. This is because the PEG-treated substrate is lubricious and in some instances the rollers will not properly grip the material. In this instance, ribbed, or textured, drive rollers may be used for an improved grip. In some cases, removing one or more sets of rollers, or drive rollers, shortens the path that the PEG-treated substrate must follow, thereby eliminating, or reducing, problems associated with slipping, or skewing of the material before it is dried and cured.

Spray Application and Vacuum Extraction

For certain substrates treated with the PEG formula, such as various high loft materials or nonwoven structures, pinch or nip-rollers may compress or flatten the structures just before they pass into the curing oven. It has been found that when these high loft or nonwoven substrates are cured in a flattened or compressed state, they will not regain their original height or loft which may reduce their ability to absorb and retain liquids and make the substrate unacceptably stiff and board-like. To prevent the substrate from becoming compressed or flattened before curing, a vacuum extraction box assembly (4) may be utilized to remove excess PEG formula without compressing the structure.

One form of a vacuum extraction device is a metal box having a width of which is slightly wider than the width of the finishing line, or approximately 75 inches, is employed. The height of the metal box is about 24 inches and the length is approximately 48 inches. The metal box contains two internal chambers and is designed so that a substrate saturated with the PEG formula is passed horizontally through the first chamber (using entrance and exit slots cut into the feed an exit ends of the first chamber).

In the chamber, in the upper portion of the metal box before the vacuum extraction unit are three side-by-side parallel hollow tubes, each separated by about 2 inches. Along their length, the hollow tubes have a series of perforated holes. Into each hole is tapped a shaped spray nozzle of the type which provides a uniform overlapping elliptical, or circular, spray pattern. All of the nozzles face downward toward the surface of the substrate to be saturate which the PEG formula as the substrate passes beneath. One end of each hollow tube is closed.

The three open ends of the spray tubes are connected to a manifold assembly through which PEG formula is pumped from a holding tank using a conventional wet-stump type industrial pump. An exterior mounted valve placed immediately before the manifold, controls the flow and pressure of the PEG formula. An on-line pressure gauge is mounted between the valve and the manifold to provide a constant pressure reading. A tube is inserted in the bottom of the first chamber to drain away excess PEG formula. The excess PEG formula drains into the formula holding tank and is re-circulated for later use.

As the PEG-saturated substrate passes through the slot into the second chamber of the metal box, it passes over a metal plate, which fits into the interior of the box approximately 12" from the bottom. Within this plate is an elongated slot that passes across the width of the metal plate. This slot is approximately one (1") in width and is made adjustable to increase, or decrease, the slot opening.

A vacuum pump and hose are fastened to the bottom of the second chamber, directly under the slot. A valve located upstream from the vacuum pump, but positioned before the hose enters the second chamber, allows the vacuum to be readily adjusted. A vacuum gauge was tapped into the hose between the valve and the metal box to provide a visual on-line reading of the amount of vacuum being applied to the slot assembly. When the electric vacuum pump is turned on negative pressure is induced into the lower chamber of the second section of the metal box. By increasing, or decreasing the vacuum pressure, combined with adjustments to the width of the vacuum slot above, the negative pressure in the lower chamber is fine tuned.

The vacuum extraction device operates in the following manner: a substrate passes through the first chamber of the metal box, directly under the three spray tube assemblies. The PEG formula is sprayed onto the surface of the substrate as it passes underneath. When the saturated substrate reaches the second chamber, it passes over the metal plate and vacuum slot and the negative pressure in the lower chamber uniformly pulls the unnecessary PEG formula from the substrate. The removed PEG formula is returned to the holding tank for reuse. The PEG-treated substrate moves from the metal box into the curing oven. While passing through the metal box, light tension is maintained on the substrate by a standard extraction roller assembly.

Foaming of the PEG Formula and Vacuum Extraction

Standard, commercially available foaming equipment (5) of the type used by numerous companies to apply various finishes to woven, nonwoven and knit fabrics and materials, may be readily employed in the application of the PEG formula.

Single, or double-sided foaming heads may be utilized to apply the PEG formula to one, or both, side(s) of a substrate. For example, when a dense or high loft substrate is being PEG-treated, a double sided foaming arrangement will permit improved penetration of the formula into the structure being treated. When necessary, after foaming, a vacuum extraction device may be utilized to remove excess PEG Formula from the substrate prior to curing. By using a foaming technique to apply PEG, more dense, and/or higher loft substrates may be finished with the formulation. Foaming of PEG offers the flexibility of applying the formulation to one, or both, side(s) of a substrate dependent upon the type of substrate being treated with PEG.

Module "B" Section

Methods and Techniques for Drying and Curing the PEG Formulation after its Application to a Substrate Drying/Curing A variety of readily available standardized drying frames (ovens) (FIG. 3) and devices of the type found in numerous textile finishing operations may be successfully used for curing PEG-treated substrates. In come instances, nominal modifications to an oven may be required to adapt it for application of the PEG formulation. When installed, automated computer-based controls provide optimum flexibility for managing, or controlling, the PEG drying/curing operation. Multiple independently controlled thermal zones (1) (ranging from several to as many as ten) within the PEG drying/curing oven provide additional zone-by-zone control flexibility.

Drying/curing ovens of the type designed to move a material through in a relaxed state (with no tension being applied to the substrate) on chains, or wide belts, have been found to be suitable for certain types of substrates such as nonwoven materials, tubular knits and high loft substrates. For other substrates, such as shirt weight fabrics for example, a pin tenter frame may be used to maintain tension on the substrate as it passes through the oven. The nature of the material and its intended use determines whether a substrate should be cured in a tension state or a relaxed, tensionless state.

One method to determine the proper curing or drying temperature of PEG-treated substrate is, (a) to utilize a dynamic infrared scanning thermometer and, (b) to read the temperature from the surface of the substrate.

Drying and curing temperatures, and curing dwell times for a particular substrate are sensitive to a number of variables, including fiber blends, loft and density of the structure being cured and the type of material being processed (i.e., a nonwoven, a knit and a woven substrate will generally have differing drying characteristics).

By monitoring and controlling oven-curing temperatures, scorching and over-curing of the PEG-treated substrate can be prevented. Scorching results in a degradation and "browning" of the resin/polymer. Over-curing causes a "board-like", harsh, stiff, and unacceptable hand and degrades thermal performance.

The speed, or throughput rates, of the PEG-treated substrates through the oven can be substantially increased and better controlled, if the amount of water is minimized prior to commencing the drying/curing cycle. This variable is also dependent upon the type of drying device used, the number of available zones, types of controls and the heat source utilized.

Drying temperatures after removal of the water should not exceed 220° F. (104° C.). The initial zones in the curing oven, when the substrate is still laden with moisture, can be set as high as 350° F. (176.5° C.), with the subsequent zones stepped to lower temperatures as the PEG-treated substrate dries. When the surface temperature of the material exceeds 212° F. the material is dry and all subsequent curing zones are set to 220° F. Curing of any substrate occurs in 1½ to 2 minutes. No curing beyond that time is recommended.

Drying and Curing Using Heated Drums

"Drum heaters" are a standard type of drying mechanism found in textile manufacturing. Drum heaters are comprised of a series of large hollow "drums"; each sized approximately 36" to 48" in diameter and up to approximately 72" in length. The "drums" are arranged in series and vary in number. The textile passes over and around the drums as the drums are turned by motors, belts or gears. The drums are heated with steam. The tension applied to the substrate as it passes around the drums may be easily adjusted.

To dry and cure a PEG-treated substrate, the drums are pre-heated to a temperature of approximately 210° F. (99° C.). A cloth leader is passed over the first heated drum, and then under and over, the subsequent drums until the threading of all drums has been completed. The drum drive mechanism is initiated and the drying and curing process commences. Upon completion of drying and curing a pair of drive rolls pick up and feed the dried and cured substrate to the neutralization tank as described in the Module "C" Section which follows.

Module "C" Section

Neutralization, Removal of Non-Reacted Formula Components and the Use of Softeners Once a substrate is dry/cured, the substrate is passed into a wash box (FIG. 4) comprised of a series of liquid holding tanks. The first tank (T1) may contain a basic solution consisting of water and soda ash with a ratio of 100/1 by weight. This yields a pH 11 bath. Next, the substrate is subjected to a vigorous rinse to remove salts and non-reacted formula components (T2). Non-removed surface deposits of non-reacted PEG formula can lead to a later false "wash out" reading of PEG and can initially result in false or misleading DSC thermal scans. Residual surface deposits of PEG may also give the treated substrate an unattractive physical appearance and a wet-like or greasy feel. Dyeing machines, wash boxes and dyeing jigs and in-line wash mechanisms have all been successfully utilized to neutralize substrates.

Usually a rinse, or wash, duration of 15 minutes is sufficient to return the fabric to an acceptable pH level of 6.5 to 7.5. The pH level of the water used in the processing facility itself should be monitored and the quantity of neutralizing agent used in the rinse water adjusted accordingly. Soda ash is a quick and inexpensive way to neutralize any acid remaining in the substrate after treatment with the PEG formula.

During the final rinsing of the PEG-treated substrate in a third tank (T3), a commercial softener such as SHURFINE ULTRA may be added to the rinse water to give certain substrates a softer "drape", "hand," or "feel". An appropriate softener contains cationic surfactants.

An example of a neutralization wash box can be described as follows. The wash box is placed near the exit end of the drying/curing oven. Typically, the wash box would be, at a minimum, slightly wider than the maximum width of any substrate. The wash contains at least three liquid holding chambers. The first chamber (T1) would contain the neutralization agent; the second chamber would contain rinse water (T2), while the third chamber holds various commercial softeners and water (T3).

If required, prior to final drying the saturated substrate may then undergo an extraction process to remove excess water, utilizing various vacuum extraction techniques or centrifuging.

Module "D" Section

Drying the PEG-treated Substrate after Neutralization

A variety of techniques may be utilized to dry the PEG-treated substrate after it has been neutralized, rinsed and softened.

A curing oven of the type described in the Module "B" Section is suitable for drying many types of water saturated PEG-treated substrates after the neutralization step. Drum heaters of the type discussed in the Module "B" Section may also be used.

Another type of drying device that may be readily utilized is a "loop" dryer (FIG. 5) of the type found in many textile finishing and dying operations. A loop dryer is comprised of a large enclosed metal structure the length of which may vary depending upon its intended use and application. The width of the loop dryer roughly corresponds to the width of the web material being processed. The height of the loop dryer can run from 10 to 15 feet, again dependent upon its use and the types of substrates being processed.

Contained within the loop dryer are a series of drive rollers (2) and passive roller assemblies mounted across the top and bottom of the loop dryer. A heat source (3), such as steam, gas or infrared heaters, may be contained within the dryer to assist with the drying process. Fans (1) are used to circulate large quantities of the heated air around the looped substrate material.

To commence drying, the drive rollers begin moving the PEG-treated substrate in a relaxed state in a loop fashion from roller-to-roller through the dryer, while high speed fans and blowers circulate hot air within the loop drier cabinet at appropriate speeds, with the air exhausting from a stack positioned near the top of the dryer assembly.

The now dried PEG-treated and neutralized substrates passes through an exit slot in the loop drier cabinet and passes to a winding device which winds the now dried substrate into a roll (4). This completes the PEG application process.

Bulk Treatment of Finished Products with the PEG Technology

Figure 6:
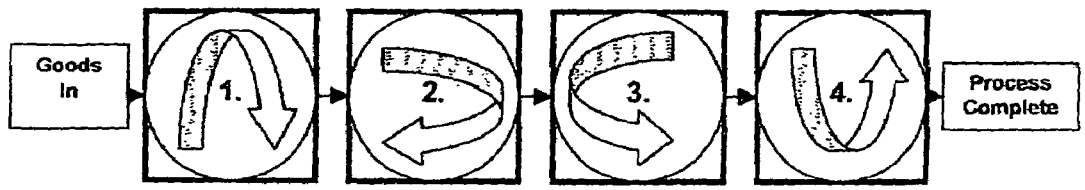
FIG. 6 depicts a process flow diagram for treating products with the PEG formula in a bulk-processing environment.
Figure 7:
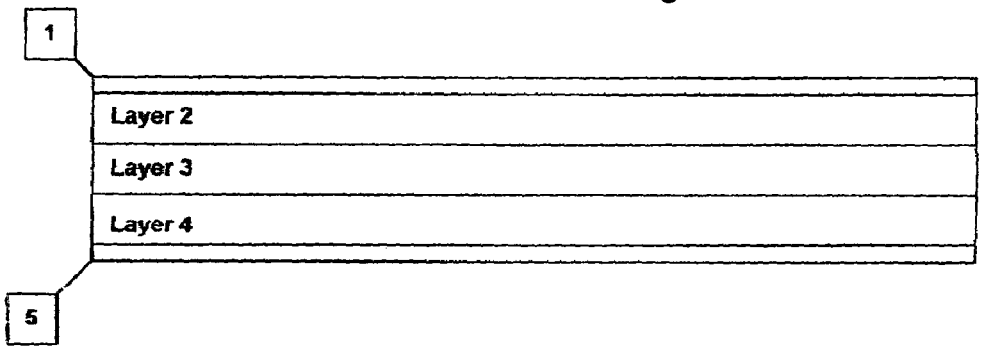
FIG. 7 depicts multiple layers of a substrate treated with the PEG formula.
Figure 8:
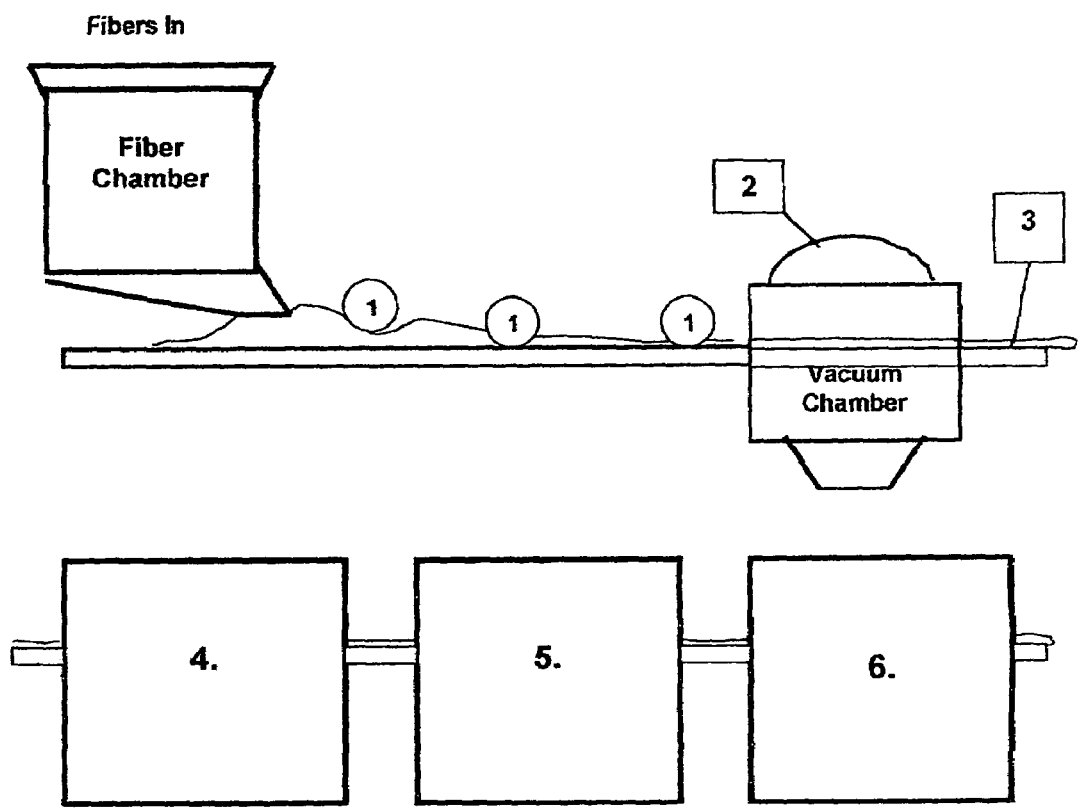
FIG. 8 depicts a process flow diagram for producing a nonwoven substrate which random fibers are permanently bonded into a durable substrate.

An alternative approach has been employed for the PEG-treatment of certain types of fully converted products such as socks, knit shirts and gloves as well as other fabric-based products that do not lend themselves to processing using the already described PEG System. This method is called "bulk treatment" (FIG. 6).

Using this technique, finished or converted fabric products are processed by combining a series of custom-made machines into a fully integrated PEG-treatment production operation. First the goods must be checked to assure they are free of oils, lubricants, softeners, etc., which could adversely effect cross-linking, then PEG formula is pumped into a combined bath/centrifuging container (1) and the products are saturated with the PEG formula. The remaining formula is drained from the container and returned to a storage tank for later reuse. The PEG treated goods are then spun in the container by a high-low speed reversible centrifuge action for specific periods of time to extract the excess formulation and arrive at the desired amount of wet add-on. The extracted formulation is returned for re-use. The PEG-treated goods are automatically transferred from the container to a large tumble-type drier/washer unit (2) where they are dried and cured utilizing a computer monitored control system. The now cured PEG-treated products are then washed, neutralized, rinsed and softened in a tumble washer (3) and then subjected to a final tumble dry cycle in a large dryer unit (4).

An alternative approach to bulk treatment processing of the type just described, is to utilize specialized equipment which applies the PEG formula by spray application in a contained "tumbling," or rotating, environment. This type of device operates very much like a conventional front-loading washer. The bulk goods to be PEG-treated are placed in the device and tumbled while a pre-measured amount of PEG formula is sprayed uniformly on the goods to be treated thereby providing very precise control of the amount of wet add-on used. The PEG-treated goods are then dried and cured in the same device as they continue to tumble and rotate. The neutralization solution may similarly be sprayed onto the treated goods, which are then rinsed and softened and given a final tumble dry.

Antimicrobial Properties of the PEG Technology

Various research and development activities and user field trials have demonstrated that the PEG Technology is antimicrobial and anti-fungal. The PEG Technology, which is non-toxic and contains no heavy metals, mechanically and environmentally controls certain microorganisms by depriving them of the environment they require to propagate or survive. Highly hydrophilic properties inherent in PEG dessicate microbes by depriving them of moisture. This is the "A" case.

Under laboratory test conditions, using standardized AATCC 100, 147-1993 and ASTM G.21 test methods, the PEG Technology has shown to be effective in preventing the population of a broad range of gram positive and gram negative bacteria and fungi. Some of the bacteria and fungi evaluated to date include gram positive *B. epidermidis, C. albicans, M. cookei, S. epidermidis, T. rubrum* and *S. aureus*, gram negative *P. mirabilis* and *K. pneumoniae* as well as the fungi *A. niger, A. repens, P. finiculosum, C. globosum, G. virens* and *A. pullulans*.

Additionally, after the PEG formula has been applied to a substrate, this structure becomes "thermally active." Briefly, this means that under certain ambient conditions, the PEG-treated fabric will absorb and store thermal energy. Conversely, the PEG-treated substrate will then release the previously stored thermal energy. Although not intended to be limited by theory, it is believed that the storing and releasing of thermal energy from a PEG-treated substrate is a potential factor in the antimicrobial control properties of the PEG Technology. The storing and releasing of thermal energy in a PEG-treated substrate is defined herein as the "B" Cause.

The third active component of the mechanism used to kill the bacteria and fungi is the inherent surfactant properties of the PEG Technology. A surfactant is a "surface active agent" and, for example, includes molecules that have a special affinity for dirt or soil and that when applied to a soiled material will attach themselves to the dirt and soil to assist in their removal. Surfactants can be designed to increase the wetting ability of water by lowering its surface tension thereby allowing the water to immediately be absorbed into a material or fabric rather than remaining on the surface as droplets.

A "surfactant" has two distinctive parts, each with differing characteristics. One part of each surfactant molecule is hydrophilic while the other is hydrophobic. The hydrophobic component will attach itself to, or surround, any surface other than water, such as particulate dirt or soil, while the hydrophilic component of the molecule will push away from the material and not become attached. Therefore, when a particulate is surrounded by surfactant molecules, it will separate from the material and not become reattached. Again, without being limited by theory, it is believed that PEG-treated substrates impart a surfactant effect to the resulting structure thereby preventing the bacteria or fungi from becoming permanently attached. The surfactant properties of the PEG Technology is the "C. Cause."

Some combination of the "A", "B" and "C" Causes prevent bacteria and fungi from growing or surviving in a laboratory environment with near 100% effectiveness. The "A" cause induces desiccation, which deprives the bacteria and fungi of the moisture necessary for them to thrive on a PEG-treated substrate. This phenomena operates in concert with the "B." Cause which may thermally stress the bacteria and fungi by altering the thermal environment surrounding the bacteria or fungi by as much as 15° F. The "C." Cause, operating in concert with the "A." and "B." Causes, prevents the bacteria and fungi from gaining a permanent grip, or hold, on the PEG-treated substrate, thereby helping to prevent their population and growth.

A few of the product categories which are suitable for the application of the PEG Technology for its antimicrobial and anti-fungal properties include virtually all healthcare, institutional and consumer products such as wound care dressings and bandages, surgical gowns and drapes, bedding products of every kind, towels, wipes, cloths, fabrics for use in home and institutional furniture and for automobile interiors as well as for human apparel of every kind and type.

Multi-Layered Substrates and Thermal Cascading

The term "thermal cascading" (FIG. 7) means that a number of individual substrates have been treated with the PEG Technology, with each substrate containing a progressively higher, or lower, molecular weight polyethylene glycol version of the PEG formula.

When these independently PEG-treated layers of substrates have been integrated into a single structure the release, or absorption, of thermal energy is substantially extended over a longer period of time and over a broader range of ambient temperatures, thereby retarding the escape, or penetration, of heat, or cold. By using "thermal cascading," a garment would become thermally "reversible," thereby providing user comfort throughout the year.

An example of "thermal cascading" is to create a garment with three individual layers of PEG-treated substrate (for example, treated with PEG 1000, 1200 and 1450 respectively. Each of these PEG designations has different temperature ranges at which they melt and solidify thus absorbing and releasing heat.

For cold weather wear, the PEG 1450 layer (Layer 2) would be worn closest to the body with the PEG 1000 (Layer 4) layer positioned in the outer-most layer. The PEG 1450 layer, next to the body, would absorb heat and help maintain a desired core temperature of approximately 93° F. If this inner layer at anytime dropped to a temperature of less than 68° F., for example, the substrate would begin to release the stored thermal energy protecting the wearer. The second, or middle, layer (Layer 3) of the PEG-treated substrate, which incorporates the PEG 1200, requires less thermal energy to activate the melting phase of the crystalline structure and will absorb thermal energy up to approximately 80° F., and begin releasing the thermal energy at temperatures less than about 50° F., thereby slowing the penetration of cold while releasing heat.

Finally, the PEG 1000 layer (the outer most layer) will charge thermally at a still lower temperature and will begin releasing the thermal energy when a cold temperature occurs. An additional advantage of "thermal cascading" is because low molecular weight PEG polymers absorb moisture more readily and effectively than high molecular weight PEG polymers, a more effective moisture management system can be developed. In this instance, maximum moisture wicking will occur with moisture wicking outward from the body (the highest molecular weight PEG-treated layer) toward the lowest molecular weight PEG-treated layer. For added comfort, in some instance it may be desirable to attach a waterproof breathable cover layer (Layer 1 and Layer 5) to one, or both, sides of the multi-layered PEG-treated substrates.

When the layered garment is reversed, the insulating performance is also. The resulting effect is that for both warm and cold weather wear, "thermal cascading" will prolong the comfort factor of the skin of the wearer and extended the duration of the cooling/warming phenomena over a wider range of temperatures, while further improving the comfort of the user by improving the moisture management of the garment.

This type of "thermal cascading" of PEG-treated substrates would have broad applicability when, for example, it is incorporated into various industrial insulation materials, or used in extreme temperature outdoor wear garments or included in certain surgical applications where a patient's body temperature needs to be maintained within in particular thermal range.

While Applicants have set forth embodiments as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

The invention claimed is:

1. A method of preparing a temperature adjustable textile comprising:
   preheating a polyethylene glycol formulation before treating the textile to a temperature of between 90° F. to about 110° F.;
   treating a textile with the polyethylene glycol formulation to form a treated textile;
   curing the treated textile at a surface temperature of the textile between about 200° F. to about 230° F. to form a cured textile;
   neutralizing the cured textile in an alkaline solution wash to form a neutral fabric whereby the potential for reaction reversal and polymer washout is eliminated; and
   drying the cured textile.

2. The method of claim 1, wherein the surface temperature of the textile does not exceed 225° F.

3. The method of claim 1, wherein the cured textile is neutralized to a pH between about 6.5 to about 7.5.

4. The method of claim 1, further including removing a polyethylene glycol formulation excess from the treated fabric.

5. The method of claim 4, wherein the polyethylene glycol formulation excess is removed using vacuum extraction.

6. The method of claim 1, further including foaming the polyethylene glycol formulation prior to applying the formulation to the textile.

7. The method of claim 1, further including preheating the treated textile before curing.

8. The method of claim 1, wherein the polyethylene glycol formulation comprises a polyethylene glycol comprised of essentially a molecular weight of a singular molecular weight.

9. The method of claim 1, wherein the polyethylene glycol formulation comprises a polyethylene glycol comprised of essentially a molecular weight between about 1400 and 1500.

10. The method of claim 1, wherein the polyethylene glycol formulation comprises a crosslinking agent, an organic acid, a metal salt and polyethylene glycol.

11. The method of claim 1, wherein the polyethylene glycol formulation contains an additive selected from the group consisting of antimicrobial agents, anti-fungal agents, surfactants, and combinations thereof.

12. A method of preparing a temperature adjustable textile comprising:
   preheating a polyethylene glycol formulation and then treating a textile with the polyethylene glycol formulation wherein the polyethylene glycol comprised of essentially a molecular weight of a singular molecular weight to form a treated textile;
   curing the treated textile at a surface temperature of the textile to a temperature not to exceed about 225° F. to form a cured textile; and
   neutralizing the cured textile to a pH between about 6.5 to about 7.5 in an alkaline solution wash to form a neutral fabric whereby the potential for reaction reversal and polymer washout is eliminated.

13. The method of claim 12, wherein the polyethylene glycol formulation is preheated to a temperature of between about 90° F. to about 110° F.

14. The method of claim 12, further including removing a polyethylene glycol formulation excess from the treated fabric.

15. The method of claim 14, wherein the polyethylene glycol formulation excess is removed using vacuum extraction.

16. The method of claim 12, further including foaming the polyethylene glycol formulation prior to applying the formulation to the textile.

17. The method of claim 12, further including preheating the treated textile before curing.

* * * * *